US012736719B2

(12) United States Patent
Kim et al.

(10) Patent No.: US 12,736,719 B2
(45) Date of Patent: Sep. 15, 2026

(54) LIGHT TRANSMISSIVE INJECTION MOLDED ARTICLE

(71) Applicant: LG ELECTRONICS INC., Seoul (KR)

(72) Inventors: Hoon Kim, Seoul (KR); Seung Cheol Jung, Seoul (KR); Hee Sup Kim, Seoul (KR); Moon Gyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 18/562,918

(22) PCT Filed: Sep. 1, 2022

(86) PCT No.: PCT/KR2022/013101
§ 371 (c)(1),
(2) Date: Nov. 21, 2023

(87) PCT Pub. No.: WO2023/080412
PCT Pub. Date: May 11, 2023

(65) Prior Publication Data
US 2024/0230968 A1 Jul. 11, 2024

(30) Foreign Application Priority Data
Nov. 5, 2021 (KR) ........................ 10-2021-0151566

(51) Int. Cl.
*G02B 5/09* (2006.01)
*F25D 23/02* (2006.01)

(52) U.S. Cl.
CPC ............. *G02B 5/09* (2013.01); *F25D 23/028* (2013.01)

(58) Field of Classification Search
CPC .......... G02B 5/02; G02B 5/09; G02B 5/0231; G02B 5/0284; G02B 5/12; G02B 5/124;
(Continued)

(56) References Cited

U.S. PATENT DOCUMENTS

2016/0178916 A1 6/2016 Kakinum et al.
2018/0267216 A1 9/2018 Otsubo
2021/0149094 A1 5/2021 Vasylyev

FOREIGN PATENT DOCUMENTS

JP 2016-080937 5/2016
KR 10-2008-0059086 6/2008
KR 10-2010-0033704 3/2010

OTHER PUBLICATIONS

International Search Report dated Dec. 15, 2022 issued in Application No. PCT/KR2022/013101.

*Primary Examiner* — Jie Lei
(74) *Attorney, Agent, or Firm* — KED & ASSOCIATES, LLP

(57) ABSTRACT

A light transmissive injection molded article is disclosed. In the light transmissive injection molded article of the present invention, one or more planes are formed at a front surface and a back surface. The planes of the back surface form a light reflection pattern configured to reflect light passing through the front surface toward the front surface. The planes of the back surface include a first inclined surface, a second inclined surface, and a third inclined surface. The first inclined surface is a plane inclined with respect to a normal direction of the front surface. The second inclined surface is a plane gradually approximating to the front surface as the second inclined surface extends far from the first inclined surface. The third inclined surface is a plane gradually approximating to the front surface as the third inclined surface extends far from the second inclined surface.

16 Claims, 12 Drawing Sheets

(58) Field of Classification Search

CPC .......... G02B 5/122; G02B 5/126; G02B 5/18; G02B 5/1842; G02B 5/136; G02B 5/045; G02B 27/14; G02B 27/143; G02B 27/06; F25D 23/02; F25D 23/028

USPC ....... 359/850, 834, 836, 529, 527, 530, 538, 359/567, 534, 10

See application file for complete search history.

LIGHT TRANSMISSIVE INJECTION MOLDED ARTICLE

CROSS-REFERENCE TO RELATED PATENT APPLICATIONS

This application is a U.S. National Stage Application under 35 U.S.C. § 371 of PCT Application No. PCT/KR2022/013101, filed Sep. 1, 2022, which claims priority to Korean Patent Application No. 10-2021-0151566, filed Nov. 5, 2021, whose entire disclosures are hereby incorporated by reference.

TECHNICAL FIELD

The present invention relates to a light transmissive injection molded article, and more particularly to a light transmissive injection molded article configured to reflect light incident upon a front surface thereof.

BACKGROUND ART

In accordance with diversification of consumers and development of advanced technology, small quantity batch production of home appliances is possible and, as such, appearances of home appliances, that is, design elements of home appliances, function as an important element in distinguishing home appliances from one another.

In connection with this, Korean Unexamined Patent Publication No. 2010-0033704 (referred to hereinafter as "related art literature") discloses a stamper provided with a micropattern. The stamper of the related art literature includes a stamper body, a plurality of micropatterns, and a space.

The plurality of micropatterns is formed at a surface of the body of the stamper. The space is formed among the micropatterns. Molds are brought into close contact with each other, thereby forming a cavity therein. A molten resin is then introduced into the cavity, to fill an interior of the cavity. The molten resin is introduced into the space among the micropatterns and, as such, copies the micropatterns to have the same shape as the micropatterns.

Light exhibits an interference phenomenon as characteristics of waves. When light advancing in air is incident upon a micropattern, a part of the light is reflected, and another part of the light is refracted. In this case, the refracted light is incident upon another micropattern and, as such, a part thereof is reflected, and another part thereof is refracted. When light beams respectively reflected in different steps in this case have the same phase, constructive interference is generated. When the light beams have different phases, destructive interference is generated.

The stamper of the related art literature adjusts spacing of the micropatterns formed at a surface of a product, thereby varying spacing of the micropatterns, and, as such, varies a wavelength of light reflected from the micropatterns. That is, when the pitch among the micropatterns and the width of micropatterns are adjusted taking into consideration an incidence direction of light incident upon the micropatterns, color of light reflected light may be varied in accordance with a gaze direction of the eye toward a product. When the stamper of the related art literature uses micropatterns having a pitch of 0.2 to 20 μm, light reflected from a surface of the product appears a color.

In the stamper of the related art literature, the micropatterns may reflect almost all of visible light through an increase in pitch and width thereof, thereby enabling a surface of the product to appear white gloss. When the stamper of the related art literature uses micropatterns having a pitch of 20 to 2,000 μm, light reflected from the product surface appears white.

However, the stamper of the related art literature simply increases the pitch and width of the micropatterns in order to enable light reflected from the product surface to appear white. That is, the stamper of the related art literature discloses technology for simply reflecting light incident upon a product surface from a surface of a micropattern by simply increasing the pitch and width of the micropattern.

Almost all of light incident upon a surface of a light transmissive plastic is refracted from the surface when an incidence angle of the light is small. In the stamper of the related art literature, however, almost all of light refracted from the surface of the product is again refracted from a back surface of the product and, as such, may not be reflected to the surface of the product. Even when the light is reflected from the back surface, there is a problem of low brightness of the product surface because reflectivity of the back surface is low.

Hot stamping is mainly used in order to exhibit a metallic texture by gloss at a particular portion of a plastic home appliance. Hot stamping represents a method for transferring a character or a pattern to a molded article or a sheet through metal deposition or from a color-coated foil or film, using heating or pressing.

However, when metal deposition is used, it is necessary to peel off a layer for surface treatment, for recycling of the home appliance, and, as such, additional costs are required. Therefore, it is desirable to reduce deposition of a metal material as much as possible, in order to enhance a recycling rate. However, the current situation is that various surface treatment methods such as metal deposition or the like are inevitably used, in order to enhance merchantability of home appliances and to secure differentiation of appearances of home appliances.

DISCLOSURE OF INVENTION

Technical Problem

An object of the present invention is to provide a light transmissive injection molded article capable of exhibiting a metallic texture by light reflection at a predetermined area thereof only through injection molding.

Another object of the present invention is to provide a light transmissive injection molded article capable of enabling recycling thereof while exhibiting a metallic texture by light reflection at a predetermined area thereof.

Another object of the present invention is to provide a light transmissive injection molded article capable of totally internally reflecting, to a front surface thereof, light refracted from the front surface to a back surface thereof.

Solution to Problem

A home appliance according to an embodiment of the present invention may include a light transmissive injection molded article.

A molding material of the light transmissive injection molded article may include glass, polymethyl methacrylate Planes of a back surface of the light transmissive injection molded article may form a light reflection pattern configured to reflect light passing through a front surface of the light transmissive injection molded article again toward the front surface. Accordingly, it may be possible to enable recycling of the light transmissive injection molded article while exhibiting a metallic texture by light reflection at a predetermined area of the light transmissive injection molded article, without using expensive hot stamping.

The planes of the back surface of the light transmissive injection molded article may form a plurality of light reflection patterns. In the light reflection pattern, portions having the same shape may be repeatedly formed.

The light reflection pattern may include a first pattern portion, a second pattern portion, a third pattern portion, and a fourth pattern portion. The first pattern portion, the second pattern portion, the third pattern portion, and the fourth pattern portion may have the same shape. The first pattern portion, the second pattern portion, the third pattern portion, and the fourth pattern portion may form a pitch.

The first pattern portion may include a first inclined surface, a second inclined surface, and a third inclined surface.

The first inclined surface may form a surface inclined toward the back surface of the light transmissive injection molded article from a normal direction of the front surface of the light transmissive injection molded article. As the first inclined surface extends far from the second inclined surface, the first inclined surface may gradually approximate to the front surface. The first inclined surface may form an angle $\alpha$ with respect to the normal direction of the front surface of the light transmissive injection molded article. $\alpha$ may be an acute angle.

The second inclined surface may form a surface inclined from the back surface of the light transmissive injection molded article toward the front surface of the light transmissive injection molded article. As the second inclined surface extends far from the first inclined surface, the second inclined surface may gradually approximate to the front surface. The first inclined surface and the second inclined surface may be interconnected. The second inclined surface may form an angle $\beta$ with respect to the normal direction of the front surface of the light transmissive injection molded article. $\beta$ may be an acute angle.

The third inclined surface may be provided at a side opposite to the first inclined surface with reference to the second inclined surface. The third inclined surface may form a surface inclined from the second inclined surface toward the front surface. As the third inclined surface extends far from the second inclined surface, the third inclined surface may gradually approximate to the front surface. The second inclined surface and the third inclined surface may be interconnected. The third inclined surface may form an angle $\delta$ with respect to the normal direction of the front surface of the light transmissive injection molded article. $\delta$ may be an acute angle.

The second pattern portion may include a 1A-th inclined surface, a 2A-th inclined surface, and a 3A-th inclined surface.

The 1A-th inclined surface may form a surface inclined toward the back surface of the light transmissive injection molded article from a normal direction of the front surface of the light transmissive injection molded article. As the 1A-th inclined surface extends far from the 2A-th inclined surface, the 1A-th inclined surface may gradually approximate to the front surface. The 1A-th inclined surface may be provided at a side opposite to the second inclined surface with reference to the third inclined surface.

The 2A-th inclined surface may form a surface inclined from the back surface of the light transmissive injection molded article toward the front surface of the light transmissive injection molded article. As the 2A-th inclined surface extends far from the 1A-th inclined surface, the 2A-th inclined surface may gradually approximate to the front surface. The 1A-th inclined surface and the 2A-th inclined surface may be interconnected. The 2A-th inclined surface may be provided at a side opposite to the third inclined surface with reference to the 1A-th inclined surface.

The 3A-th inclined surface may be provided at a side opposite to the 1A-th inclined surface with reference to the 2A-th inclined surface. The 3A-th inclined surface may form a surface inclined from the 2A-th inclined surface toward the front surface. As the 3A-th inclined surface extends far from the 2A-th inclined surface, the 3A-th inclined surface may gradually approximate to the front surface. The 2A-th inclined surface and the 3A-th inclined surface may be interconnected.

The first pattern portion, the second pattern portion, the third pattern portion, and the fourth pattern portion may have the same shape.

Lighting configured to form a light source at a height $Y_1$ from a floor may be horizontally spaced apart from the front surface of the light transmissive injection molded article by a distance $X_1$.

An incidence angle $\theta_0$ of light from the lighting incident upon the front surface of the light transmissive injection molded article may be derived by the following Expression 1.

$$\theta_0 = \tan^{-1}\left(\frac{Y_1 - Y_0}{X_1 - X_2}\right) \quad \text{[Expression 1]}$$

Here, $Y_0$ may be a height of the front surface of the light transmissive injection molded article.

A refraction angle $\theta_1$ of light incident upon the front surface of the light transmissive injection molded article at the incidence angle $\theta_0$ may be derived by the following Expression 2.

$$\theta_1 = \sin^{-1}\left(\frac{1}{n_1}\sin\theta_0\right) \quad \text{[Expression 2]}$$

Here, $n_1$ may be a refractive index of the light transmissive injection molded article. The refractive index of air may be 1.0.

An eye of a user having an eye height of $Y_2$ from the floor may be horizontally spaced apart from the front surface of the light transmissive injection molded article by a distance of $X_2$.

A refraction angle $\theta_3$ of light advancing to the eye of the user after being refracted from the front surface of the light transmissive injection molded article may be derived by the following Expression 3.

$$\theta_3 = \tan^{-1}\left(\frac{Y_2 - Y_0}{X_2}\right) \quad \text{[Expression 3]}$$

An incidence angle $\theta_2$ of light corresponding to the refraction angle $\theta_3$ of the front surface of the light transmissive injection molded article may be derived by the following Expression 4.

$$\theta_2 = \sin^{-1}\left(\frac{1}{n_1}\sin\theta_3\right) \text{ or } \quad \text{[Expression 4]}$$

$$\theta_3 = \sin^{-1}(n_1\sin\theta_2)$$

The first inclined surface, the second inclined surface, and the third inclined surface may sequentially reflect light passing through the front surface of the light transmissive injection molded article.

Light refracted from the front surface of the light transmissive injection molded article at a refraction angle of $\theta_1$ may be incident upon the first inclined surface at an incidence angle of i1. i1 may be derived by the following Expression 5.

$$i_1 = -\alpha - \theta_1 + 90 > \theta_c \quad \text{[Expression 5]}$$

$$\theta_c = \sin^{-1}\left(\frac{1}{n_1}\right)$$

Here, $\theta_c$ may be an incidence angle at which total internal reflection begins. That is, $\theta_c$ may be a critical angle. Light incident upon the first inclined surface at an incidence angle of i1, which is greater than $\theta_c$, may be totally internally reflected toward the second inclined surface.

An incidence angle and a reflection angle at a reflective surface may be equal. Accordingly, light reflected from the first inclined surface may form an angle of $2\alpha+\theta_1$ with respect to the normal direction of the front surface of the light transmissive injection molded article.

Light reflected from the first inclined surface at a reflection angle of i1 may be incident upon the second inclined surface at an incidence angle of i2. i2 may be derived by the following Expression 6.

$$i_2 = 2\alpha + \beta + \theta_1 - 90 > \theta_c \quad \text{[Expression 6]}$$

The light incident upon the second inclined surface at the incidence angle of i2, which is greater than $\theta_c$, may be totally internally reflected toward the third inclined surface 203.

An incidence angle and a reflection angle at a reflective surface may be equal. Accordingly, light reflected from the second inclined surface may form an angle of β-A with respect to the normal direction of the front surface of the light transmissive injection molded article. Here, A may be as follows.

$$A = 180 - 2\alpha - \beta - \theta_1$$

Light reflected from the second inclined surface at a reflection angle of i2 may be incident upon the third inclined surface at an incidence angle of i3. i3 may be derived by the following Expression 7.

$$i_3 = -2\alpha + 2\beta + \delta + \theta_1 - 90 > \theta_c \quad \text{[Expression 7]}$$

The light incident upon the third inclined surface at the incidence angle of i3, which is greater than $\theta_c$, may be totally internally reflected toward the front surface of the light transmissive injection molded article.

An incidence angle and a reflection angle at a reflective surface may be equal. Accordingly, light reflected from the third inclined surface may form an angle of δ-B with respect to the normal direction of the front surface of the light transmissive injection molded article. Here, B may be as follows.

$$B = \beta - A - \delta$$

To enable the light reflected from the third inclined surface to advance to the eye of the user after being refracted from the front surface of the light transmissive injection molded article, the following Expression 8 may be satisfied.

$$\theta_2 = \delta - B \quad \text{[Expression 8]}$$

$$\theta_2 = -2\alpha - 2\beta + 2\delta - \theta_1 + 180$$

To enable the light reflected from the first inclined surface to be completely reflected from the second inclined surface and, at the same time, enable the light reflected from the second inclined surface to be completely reflected from the third inclined surface, the following expression may be satisfied.

$$L_1\cos\alpha - L_2\cos\beta = L_4\cos(2\alpha + \theta_1)$$

$$L_1\sin\alpha + L_2\sin\beta = L_4\sin(2\alpha + \theta_1)$$

Accordingly, light advancing to the eye of the user after passing through the front surface may form constant luminance throughout the entirety of the front surface.

Here, $L_1$ may be a length of the first inclined surface, $L_2$ may be a length of the second inclined surface, and $L_4$ may be a length of a longest one of virtual lines interconnecting a point of the first inclined surface and a point of the second inclined surface. Accordingly, when α, β, and $\theta_0$ are determined, $L_1$ and $L_2$ may have a predetermined ratio. The above expression may be arranged into the following Expression 9.

$$\tan(2\alpha + \theta_1) = \frac{L_1\sin\alpha + L_2\sin\beta}{L_1\cos\alpha - L_2\cos\beta} \quad \text{[Expression 9]}$$

For arrangement of a plurality of light reflection patterns parallel to the front surface, the following Expression 10 may be satisfied. Expression 10 may mean that a minimum distance between the front surface and the first inclined surface is equal to a minimum distance between the front surface and the third inclined surface.

$$L_1\cos\alpha - L_2\cos\beta = L_3\cos\delta \quad \text{[Expression 10]}$$

As the first inclined surface, the second inclined surface, and the third inclined surface satisfy Expression 10, the light transmissive injection molded article may form a substantially constant thickness in a pitch direction.

A light reflection pattern having various shapes and various sizes may be derived by determining $\theta_0$, $\theta_3$, $n_1$, α, β, δ, $L_1$, $L_2$, and $L_3$ under conditions satisfying the above-described Expressions 1 to 10.

$\delta_0$ may be 41.8°, and $\theta_3$ may be 43.0°. $n_1$ may be 1.59 $L_1$ may be 0.049 mm. $L_2$ may be 0.041 mm. $L_3$ may be 0.041 mm. The length of the second inclined surface in the pitch direction of the light reflection pattern may be 0.04 mm. The pitch of the first inclined surface, the second inclined surface, and the third inclined surface forming the light reflection pattern may be 0.07 mm.

The first inclined surface, the second inclined surface, and the third inclined surface may reflect light passing through the front surface of the light transmissive injection molded article in a reverse order. That is, the first inclined surface, the second inclined surface, and the third inclined surface may completely reflect light passing through the front surface of the light transmissive injection molded article in a sequential order and a reverse order.

Light refracted at a refraction angle of $\theta_1$ from the front surface of the light transmissive injection molded article may be incident upon the third inclined surface at an incidence angle of $i_3$. $i_3$ may be derived by the following Expression 11.

$$i_3 = -\delta + \theta_1 + 90 > \theta_c \quad \text{[Expression 11]}$$

$$\theta_c = \sin^{-1}\left(\frac{1}{n_1}\right)$$

Here, $\theta_c$ may be an incidence angle at which total internal reflection begins. That is, $\theta_c$ may be a critical angle. Light incident upon the third inclined surface at an incidence angle of $i_3$, which is greater than $\theta_c$, may be totally internally reflected toward the second inclined surface.

An incidence angle and a reflection angle at a reflective surface may be equal. Accordingly, light reflected from the third inclined surface may form an angle of $2\delta-\theta_1$ with respect to the normal direction of the front surface of the light transmissive injection molded article.

Light reflected from the third inclined surface at a reflection angle of $i_3$ may be incident upon the second inclined surface at an incidence angle of $i_2$. $i_2$ may be derived by the following Expression 12.

$$i_2 = 90 - C > \theta_c \quad \text{[Expression 12]}$$

$$C = \beta - 2\delta + \theta_1$$

The light incident upon the second inclined surface at the incidence angle of $i_2$, which is greater than $\theta_c$, may be totally internally reflected toward the first inclined surface.

An incidence angle and a reflection angle at a reflective surface may be equal. Accordingly, light reflected from the second inclined surface forms an angle of D with respect to the normal direction of the front surface of the light transmissive injection molded article. Here, D may be as follows.

$$D = 180 - C - \beta$$

Light reflected from the second inclined surface at a reflection of $i_2$ may be incident upon the first inclined surface at an incidence angle of $i_1$. $i_1$ may be derived by the following Expression 13.

$$i_1 = 90 - D + \alpha \quad \text{[Expression 13]}$$

The light incident upon the first inclined surface at the incidence angle of $i_1$, which is greater than $\theta_c$, may be totally internally reflected toward the front surface of the light transmissive injection molded article.

An incidence angle and a reflection angle at a reflective surface may be equal. Accordingly, light reflected from the first inclined surface may form an angle of $D-2\alpha$ with respect to the normal direction of the front surface of the light transmissive injection molded article. To enable the light reflected from the first inclined surface to advance to the eye of the user after being refracted from the front surface of the light transmissive injection molded article, the following Expression 14 may be satisfied.

$$\theta_2 = D - 2\alpha \quad \text{[Expression 14]}$$

$$\theta_2 = -2\alpha - 2\beta + 2\delta - \theta_1 + 180$$

A light reflection pattern having various shapes and various sizes may be derived by determining $\theta_0$, $\theta_3$, $n_1$, $\alpha$, $\beta$, $\delta$, $L_1$, $L_2$, and $L_3$ under conditions satisfying the above-described Expressions 9 to 14.

$\theta_0$ may be 41.8°, and $\theta_3$ may be 43.0°. $n_1$ may be 1.59. $L_1$ may be 0.049 mm. $L_2$ may be 0.041 mm. $L_3$ may be 0.041 mm. The length of the second inclined surface in the pitch direction of the light reflection pattern may be 0.04 mm. The pitch of the first inclined surface, the second inclined surface, and the third inclined surface forming the light reflection pattern may be 0.07 mm.

Advantageous Effects of Invention

In accordance with the embodiments of the present invention, it may be possible to enable recycling of the light transmissive injection molded article while exhibiting a metallic texture by light reflection at a predetermined area of the light transmissive injection molded article, without using expensive hot stamping, as one or more planes are formed at the front surface and the back surface of the light transmissive injection molded article, and the planes of the back surface reflect light passing through the front surface toward the front surface.

In accordance with embodiments of the present invention, light advancing to the eye of the user after passing through the front surface may form constant luminance throughout the entirety of the front surface as the first inclined surface and the second inclined surface satisfy the following expression and, as such, light reflected from the first inclined surface is completely reflected at the second inclined surface, and light reflected from the second inclined surface is completely reflected at the third inclined surface.

$$\tan(2\alpha + \theta_1) = \frac{L_1\sin\alpha + L_2\sin\beta}{L_1\cos\alpha - L_2\cos\beta}$$

$$\theta_1 = \sin^{-1}\left(\frac{1}{n_1}\sin\theta_0\right)$$

In accordance with the embodiments of the present invention, the first inclined surface, the second inclined surface, and the third inclined surface satisfy the following expression and, as such, may totally internally reflect light passing through the front surface in a sequential order and a reverse order. Accordingly, light advancing to the eye of the user after passing through the front surface may form luminance corresponding to metallic texture.

$$i_1 = -\alpha - \theta_1 + 90 > \theta_c$$

$$i_2 = 2\alpha + \beta + \theta_1 - 90 > \theta_c$$

$$i_3 = 2\alpha + 2\beta + \delta + \theta_1 - 90 > \theta_c$$

$$\theta_c = \sin^{-1}\left(\frac{1}{n_1}\right)$$

In accordance with the embodiments of the present invention, the first inclined surface, the second inclined surface, and the third inclined surface satisfy the following expression and, as such, the plurality of light reflection patterns may be arranged in a direction parallel to the front surface. Accordingly, the light transmissive injection molded article may form a substantially constant thickness in a pitch direction.

$$L_1\cos\alpha - L_2\cos\beta = L_3\cos\delta$$

BRIEF DESCRIPTION OF DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

DESCRIPTION OF REFERENCE NUMERALS OF MAIN PARTS OF THE DRAWINGS

- 1: home appliance
- 10: light transmissive injection molded article
- 10A: first drawer
- 10B: second drawer
- 10C: third drawer
- 10D: fourth drawer
- 10E: fifth drawer
- 11: handle portion
- 100: front surface
- 200: back surface
- 201: first inclined surface
- 202: second inclined surface
- 203: third inclined surface
- 201A: 1A-th inclined surface
- 202A: 2A-th inclined surface
- 203A: 3A-th inclined surface
- 210: light reflection pattern
- 211: first pattern portion
- 212: second pattern portion
- 213: third pattern portion
- 214: fourth pattern portion

BEST MODE FOR CARRYING OUT THE INVENTION

Figure 1:
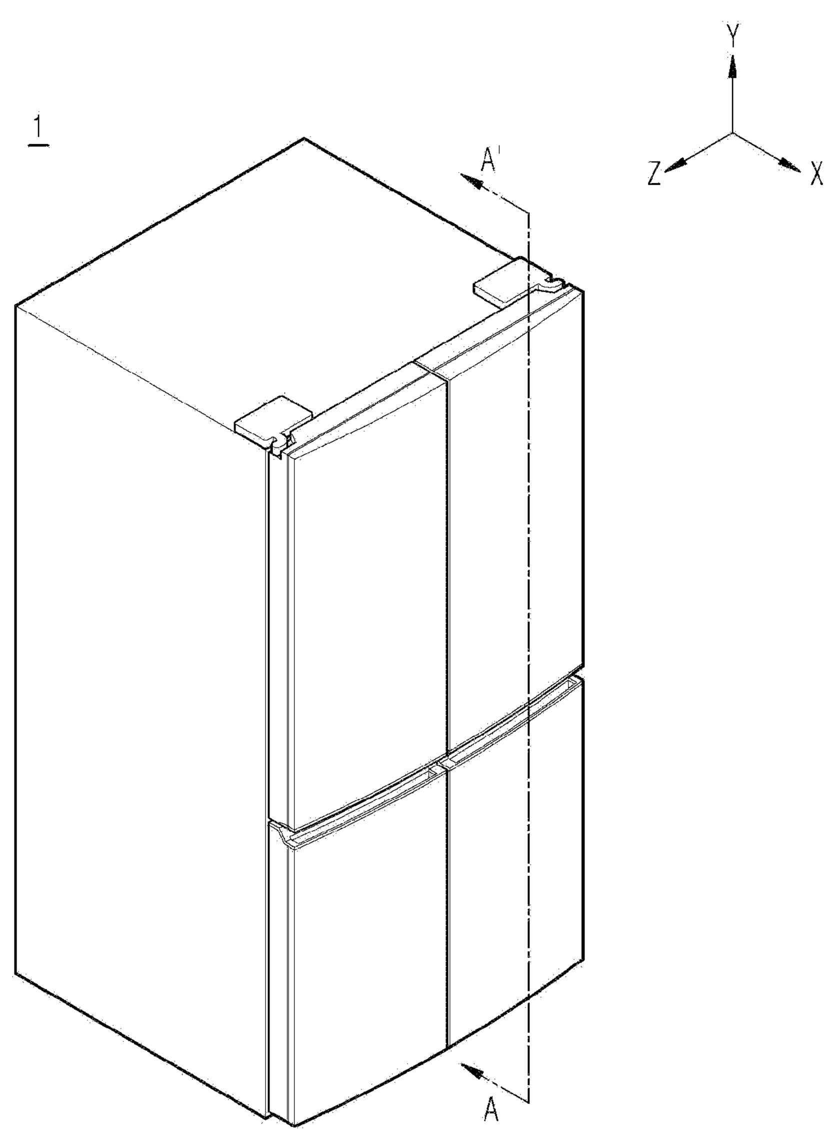
FIG. 1 is a perspective view of a home appliance according to an embodiment of the present invention.
Figure 2:
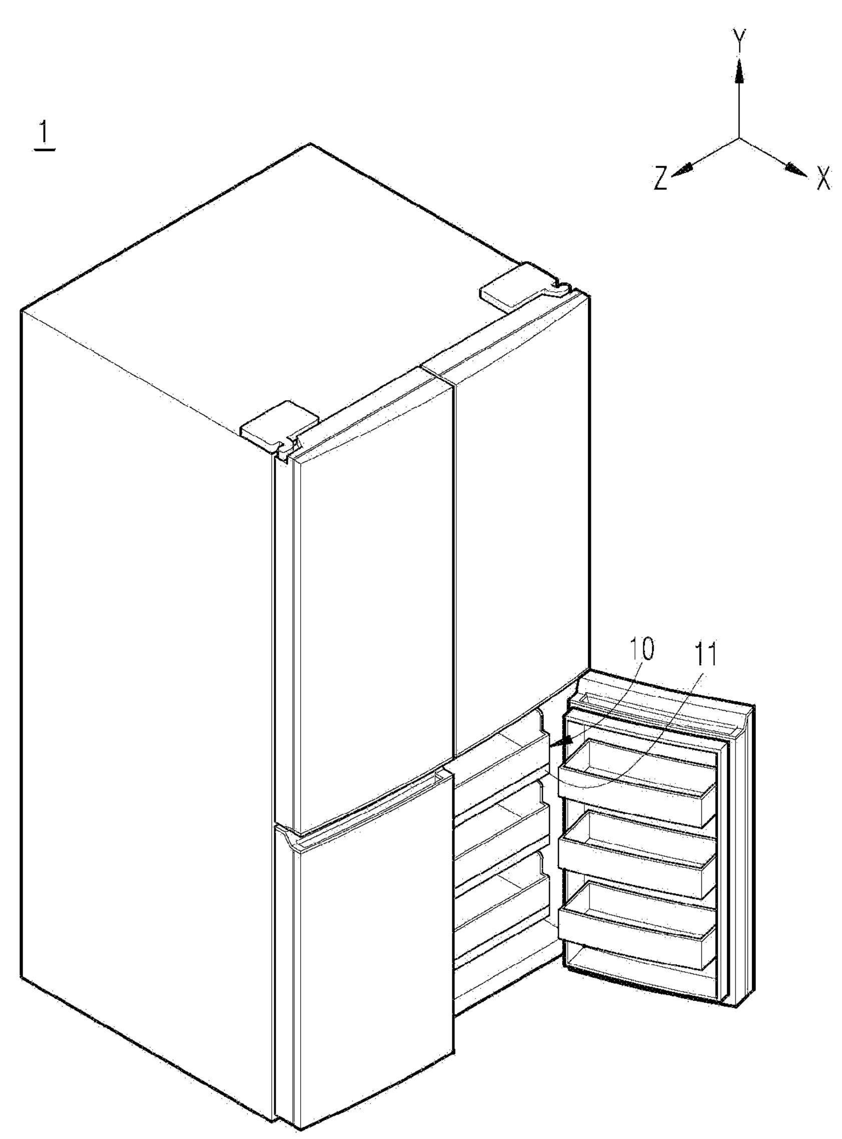
FIG. 2 is a perspective view showing a door-opened state of the home appliance of FIG. 1.

FIG. 1 is a perspective view of a home appliance 1 according to an embodiment of the present invention. FIG. 2 is a perspective view showing a door-opened state of the home appliance 1 of FIG. 1.

The home appliance 1 according to the embodiment of the present invention means a home appliance 1 including a light transmissive injection molded article 10. FIGS. 1 and 2 show a refrigerator 1 as an example of the home appliance 1. The home appliance 1 may mean an electric machine and mechanism for domestic life such as a television, a washing machine, an air conditioner, etc.

The light transmissive injection molded article 10 according to the embodiment of the present invention means a part having light transmissivity from among parts of the home appliance 1 manufactured through injection molding. Light transmissivity literally represents the capability to transmit light.

Figure 3:
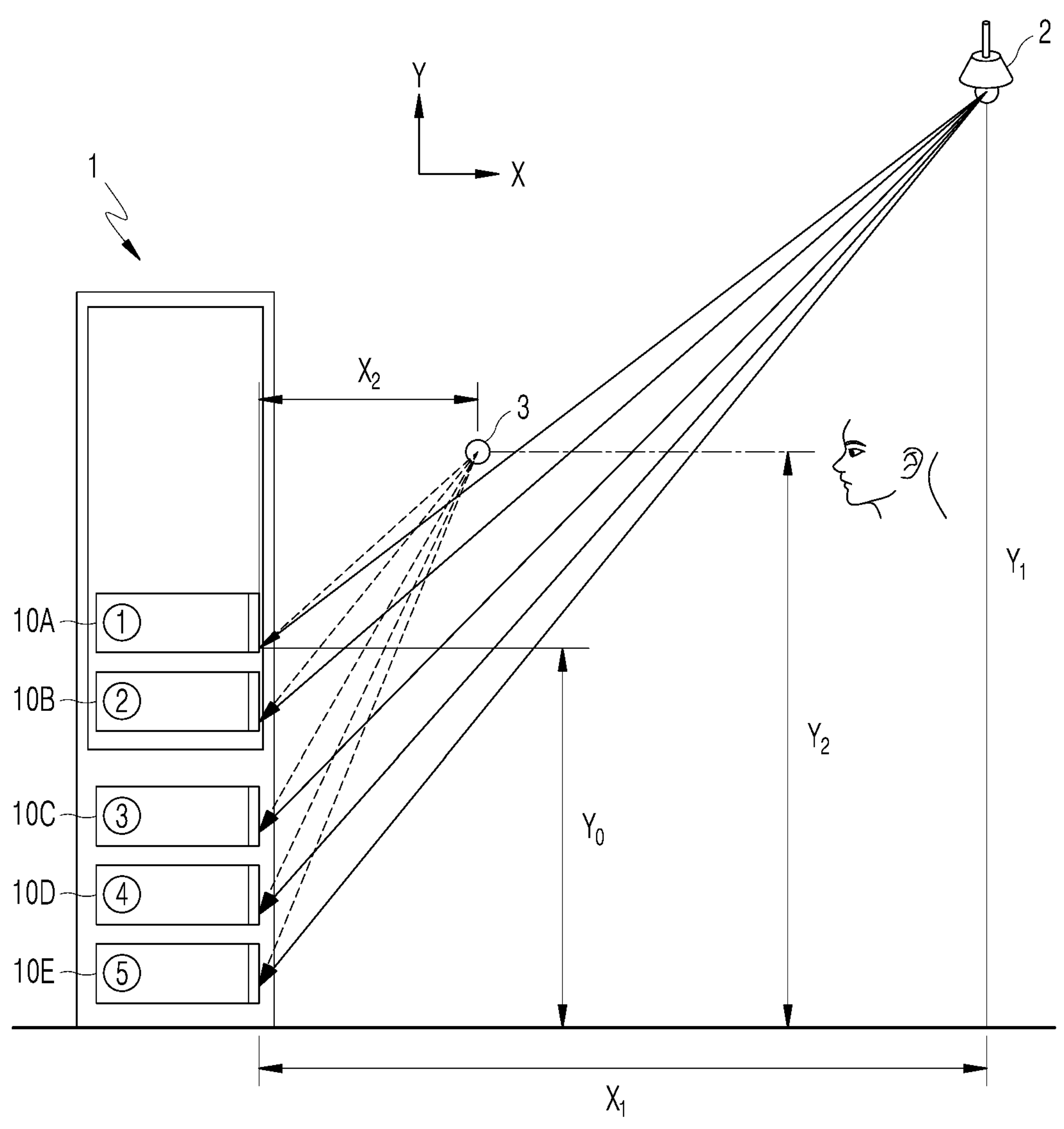
FIG. 3 is a cross-sectional view of the home appliance taken along line A-A' in FIG. 1.

A molding material of the light transmissive injection molded article 10 may include glass, polymethyl methacrylate FIG. 3 is a cross-sectional view of the home appliance 1 taken along line A-A' in FIG. 1.

Although FIGS. 2 and 3 show a drawer 10, which is one of parts of the refrigerator 1, as an example of the light transmissive injection molded article 10, the light transmissive injection molded article 10 may mean a shelf, a basket, a storage box, a side dish box, an ice maker, or the like, which is one of the parts of the refrigerator 1.

The light transmissive injection molded article 10, which is one of the parts of the refrigerator 1, may mean a portion of a door of the refrigerator 1. That is, it should be understood that the light transmissive injection molded article 10, which is one of the parts of the refrigerator 1, collectively refers to parts of the refrigerator 1 formed with portions having light transmissivity.

As shown in FIGS. 2 and 3, a plurality of drawers 10 may be provided in an interior of the refrigerator 1. The plurality of drawers 10 may be disposed at different levels from a floor, respectively.

In the following description, a two-dimensional Cartesian coordinate system constituted by an X-axis and a Y-axis and a three-dimensional Cartesian coordinate system constituted by an X-axis, a Y-axis and a Z-axis will be utilized, for better understanding of the present invention.

As shown in FIG. 3, the plurality of drawers 10 may include a first drawer 10A, a second drawer 10B, a third drawer 10C, a fourth drawer 10D, and a fifth drawer 10E.

The first drawer 10A means a drawer 10 provided at a highest position in a Y-axis direction from among the drawers. The second drawer 10B means a drawer 10 provided under the first drawer 10A. The third drawer 10C means a drawer 10 provided under the second drawer 10B. The fourth drawer 10D means a drawer 10 provided under the third drawer 10C. The fifth drawer 10E means a drawer 10 provided under the fourth drawer 10D.

A bottom portion of a front surface of the first drawer 10A may be disposed at a height $Y_0$ from the floor. $Y_0$ may be reflected as a constant upon designing the light transmissive injection molded article 10.

Figure 4A:
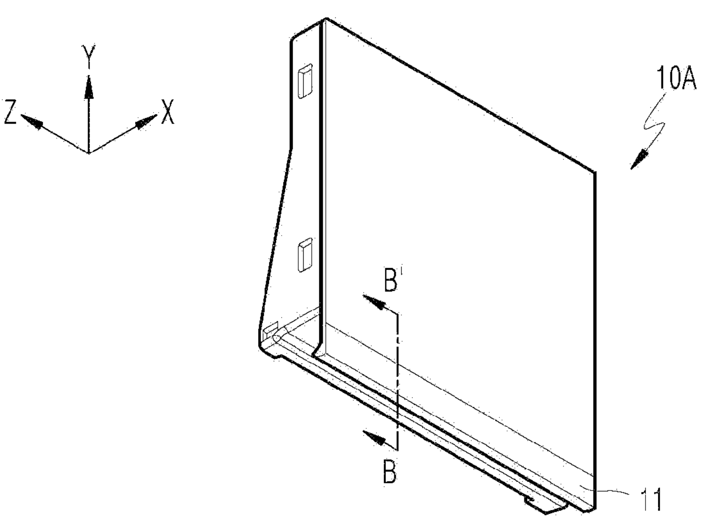
FIG. 4*a* is a perspective view showing a part of the home appliance of FIG. 3 (a light transmissive injection molded article).
Figure 4B:
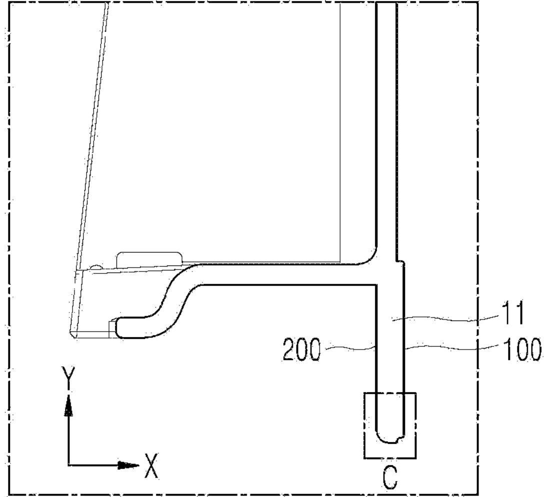
FIG. 4*b* is a cross-sectional view of the light transmissive injection molded article taken along line B-B' in FIG. 4*a*.
Figure 4C:
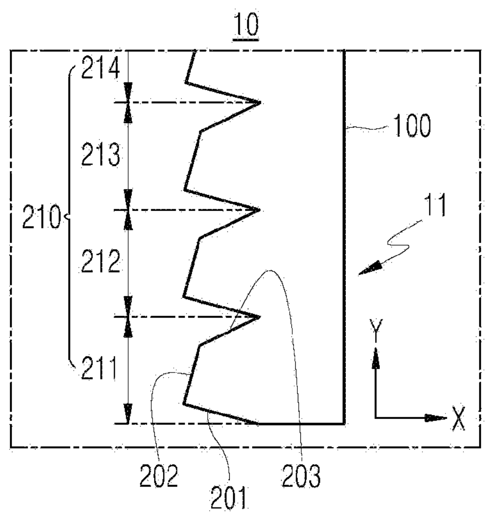
FIG. 4*c* is an enlarged view of a portion C of the light transmissive injection molded article of FIG. 4*b*.

FIG. 4*a* is a perspective view showing a part of the home appliance 1 of FIG. 3 FIG. 4*c* is an enlarged view of a portion C of the light transmissive injection molded article 10 of FIG. 4*b*. A right side in a state shown in FIG. 4*c* should be understood as a front surface 100 of the light transmissive injection molded article 10. A left side in the state shown in FIG. 4*c* should be understood as a back surface 200 of the light transmissive injection molded article 10.

As shown in FIGS. 4*a* and 4*b*, a handle portion The front surface 100 of the handle portion 11 may form one plane parallel to a YZ plane. Planes of the back surface 200 of the handle portion 11 may form a light reflection pattern 210 configured to reflect light passing through the front surface 100 of the handle portion 11 again toward the front surface 100. The planes of the back surface 200 of the handle portion 11 may form a plurality of light reflection patterns 210. The light reflection patterns 210 may mean that portions having the same shape are repeatedly formed.

For example, as shown in FIG. 4*c*, the light reflection pattern 210 may include a first pattern portion 211, a second pattern portion 212, a third pattern portion 213, and a fourth pattern portion 214.

The first pattern portion 211, the second pattern portion 212, the third pattern portion 213, and the fourth pattern portion 214 may have the same shape. The first pattern portion 211, the second pattern portion 212, the third pattern portion 213, and the fourth pattern portion 214 may define a pitch in the Y-axis direction with reference to FIG. 4*c*.

Figure 5:
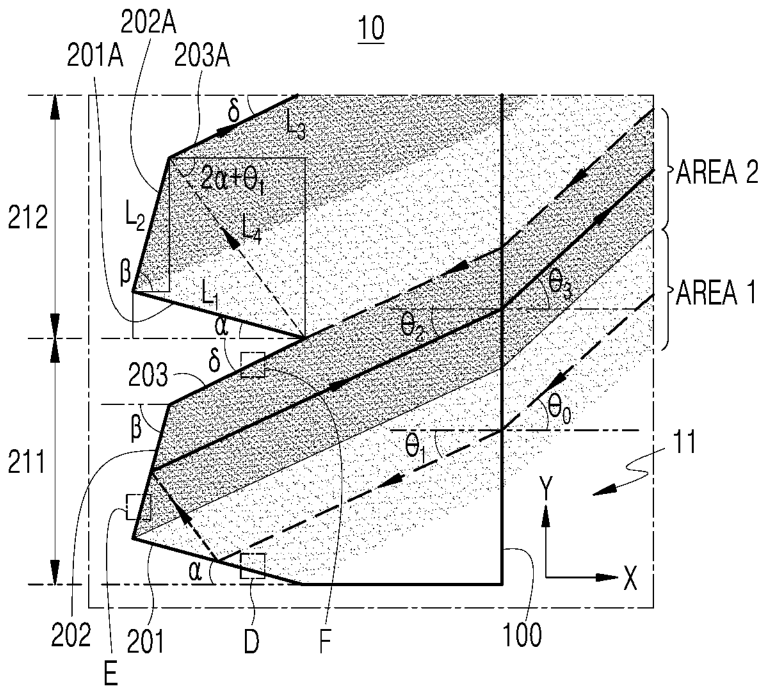
FIG. 5 is an enlarged view of a portion C of the light transmissive injection molded article of FIG. 4*b*, and is a view briefly showing an advance path of light incident upon a front surface of the light transmissive injection molded article at $\theta_0$.

FIG. 5 is an enlarged view of a portion C of the light transmissive injection molded article 10 of FIG. 4*b*, and is a view briefly showing an advance path of light incident upon the front surface 100 of the light transmissive injection molded article 10 at 00.

As shown in FIG. 5, the first pattern portion 211 may include a first inclined surface 201, a second inclined surface 202, and a third inclined surface 203.

The first inclined surface 201 may form a surface inclined toward the back surface 200 of the handle portion 11 with respect to a normal direction of the front surface 100 of the handle portion 11. In FIG. 5, the normal direction of the front surface 100 of the handle portion 11 is indicated by a two-dot chain line.

As the first inclined surface 201 extends far from the second inclined surface 202, the first inclined surface 201 may gradually approximate to the front surface 100. The first inclined surface 201 may form an angle $\alpha$ with respect to the normal direction of the front surface 100 of the handle portion 11. $\alpha$ may be an acute angle.

The second inclined surface 202 may form a surface inclined from the back surface 200 of the handle portion 11 toward the front surface 100 of the handle portion 11. As the second inclined surface 202 extends far from the first inclined surface 201, the second inclined surface 202 may gradually approximate to the front surface 100. The first inclined surface 201 and the second inclined surface 202 may be interconnected.

The second inclined surface 202 may form an angle $\beta$ with respect to the normal direction of the front surface 100 of the handle portion 11. $\beta$ may be an acute angle.

The third inclined surface 203 is provided at a side opposite to the first inclined surface 201 with reference to the second inclined surface 202. The third inclined surface 203 may form a surface inclined from the second inclined surface 202 toward the front surface 100. As the third inclined surface 203 extends far from the second inclined surface 202, the third inclined surface 203 may gradually approximate to the front surface 100.

The second inclined surface 202 and the third inclined surface 203 may be interconnected. The third inclined surface 203 may form an angle $\delta$ with respect to the normal direction of the front surface 100 of the handle portion 11. $\delta$ may be an acute angle.

As shown in FIG. 5, the second pattern portion 212 may include a 1A-th inclined surface 201A, a 2A-th inclined surface 202A, and a 3A-th inclined surface 203A.

The 1A-th inclined surface 201A may form a surface inclined toward the back surface 200 of the handle portion 11 from a normal direction of the front surface 100 of the handle portion 11. As the 1A-th inclined surface 201A extends far from the 2A-th inclined surface 202A, the 1A-th inclined surface 201A may gradually approximate to the front surface 100. The 1A-th inclined surface 201A may be provided at a side opposite to the second inclined surface 202 with reference to the third inclined surface 203.

The 2A-th inclined surface 202A may form a surface inclined from the back surface 200 of the handle portion 11 toward the front surface 100 of the handle portion 11. As the 2A-th inclined surface 202A extends far from the 1A-th inclined surface 201A, the 2A-th inclined surface 202A may gradually approximate to the front surface 100. The 1A-th inclined surface 201A and the 2A-th inclined surface 202A may be interconnected. The 2A-th inclined surface 202A may be provided at a side opposite to the third inclined surface 203 with reference to the 1A-th inclined surface 201A.

The 3A-th inclined surface 203A may be provided at a side opposite to the 1A-th inclined surface 201A with reference to the 2A-th inclined surface 202A. The 3A-th inclined surface 203A may form a surface inclined from the 2A-th inclined surface 202A toward the front surface 100. As the 3A-th inclined surface 203A extends far from the 2A-th inclined surface 202A, the 3A-th inclined surface 203A may gradually approximate to the front surface 100. The 2A-th inclined surface 202A and the 3A-th inclined surface 203A may be interconnected.

The first pattern portion 211, the second pattern portion 212, the third pattern portion 213, and the fourth pattern portion 214 may have the same shape. Accordingly, no detailed description will be given of the second pattern portion 212, the third pattern portion 213, and the fourth pattern portion 214.

As shown in FIG. 3, lighting 2 configured to form a light source at a height $Y_1$ from the floor may be horizontally spaced apart from the front surface 100 of the handle portion 11 of the first drawer 10A by a distance $X_1$. $Y_1$ and $X_1$ may be reflected as constants upon designing the light transmissive injection molded article 10.

As shown in FIG. 5, an incidence angle $\theta_0$ of light from the lighting 2 incident upon the front surface 100 of the handle portion 11 of the first drawer 10A may be derived by the following Expression 1. It is assumed that the incidence angle $\theta_0$ of light from the lighting 2 incident upon the front surface 100 of the handle portion 11 of the first drawer 10A is constant.

$$\theta_0 = \tan^{-1}\left(\frac{Y_1 - Y_0}{X_1 - X_2}\right) \quad \text{[Expression 1]}$$

A refraction angle $\theta_1$ of light incident upon the front surface 100 of the handle portion 11 of the first drawer 10A at the incidence angle $\theta_0$ may be derived by the following Expression 2.

$$\theta_1 = \sin^{-1}\left(\frac{1}{n_1}\sin\theta_0\right) \quad \text{[Expression 2]}$$

Here, $n_1$ is a refractive index of the light transmissive injection molded article 10. It is assumed that the refractive index of air is 1.0.

As shown in FIG. 3, an eye 3 of a user having an eye height of $Y_2$ from the floor may be horizontally spaced apart from the front surface 100 of the handle portion 11 of the first drawer 10A by a distance of $X_2$. $Y_2$ and $X_2$ may be reflected as constants upon designing the light transmissive injection molded article 10.

As shown in FIG. 5, a refraction angle $\theta_3$ advancing to the eye 3 of the user after being refracted from the front surface 100 of the handle portion 11 of the first drawer 10A may be derived by the following Expression 3. It is assumed that the refraction angle $\theta_3$ advancing to the eye 3 of the user after being refracted from the front surface 100 of the handle portion 11 of the first drawer 10A is constant.

$$\theta_3 = \tan^{-1}\left(\frac{Y_2 - Y_0}{X_2}\right) \quad \text{[Expression 3]}$$

An incidence angle $\theta_2$ of light corresponding to the refraction angle $\theta_3$ of the front surface 100 of the handle portion 11 of the first drawer 10A may be derived by the following Expression 4.

$$\theta_2 = \sin^{-1}\left(\frac{1}{n_1}\sin\theta_3\right) \text{ or } \quad \text{[Expression 4]}$$

$$\theta_3 = \sin^{-1}(n_1\sin\theta_2)$$

As shown in FIG. 5, the first inclined surface 201, the second inclined surface 202, and the third inclined surface 203 may sequentially reflect light passing through the front surface 100 of the handle portion 11 of the first drawer 10A.

Figure 6A:
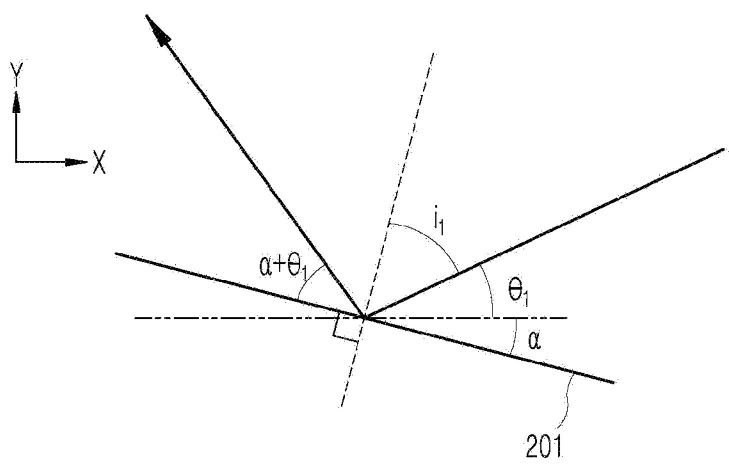
FIG. 6*a* is an enlarged view of a portion D of the light transmissive injection molded article of FIG. 5, and is a view showing an advance path of light at a first inclined surface.
Figure 6B:
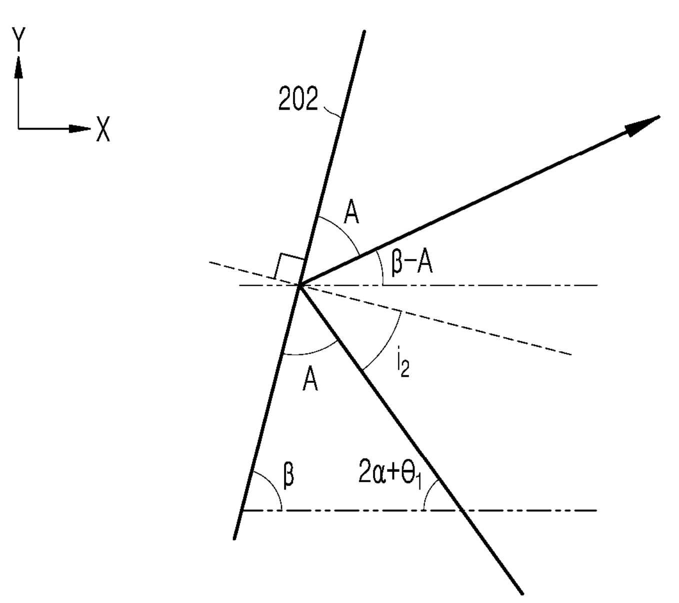
FIG. 6*b* is an enlarged view of a portion E of the light transmissive injection molded article of FIG. 5, and is a view showing an advance path of light at a second inclined surface.

FIG. 6*a* is an enlarged view of a portion D of the light transmissive injection molded article 10 of FIG. 5, and is a view showing an advance path of light at the first inclined surface 201. FIG. 6*b* is an enlarged view of a portion E of the light transmissive injection molded article 10 of FIG. 5, and is a view showing an advance path of light at the second inclined surface 202.

As shown in FIGS. 6*a* and 6*b*, light refracted from the front surface 100 of the handle portion 11 of the first drawer 10A at a refraction angle of $\theta_1$ may be incident upon the first inclined surface 201 at an incidence angle of i1. i1 may be derived by the following Expression 5.

$$i_1 = -\alpha - \theta_1 + 90 > \theta_c \quad \text{[Expression 5]}$$

$$\theta_c = \sin^{-1}\left(\frac{1}{n_1}\right)$$

Here, $\theta_c$ is an incidence angle at which total internal reflection begins. That is, $\theta_c$ is a critical angle. Accordingly, light incident upon the first inclined surface 201 at an incidence angle of i1, which is greater than $\theta_c$, may be totally internally reflected toward the second inclined surface 202.

As shown in FIGS. 6*a* and 6*b*, an incidence angle and a reflection angle at a reflective surface are equal. Accordingly, light reflected from the first inclined surface 201 forms an angle of $2\alpha+\theta_1$ with respect to the normal direction of the front surface 100 of the handle portion 11.

As shown in FIGS. 6*a* and 6*b*, light reflected from the first inclined surface 201 at a reflection angle of i1 may be incident upon the second inclined surface 202 at an incidence angle of $i_2$. $i_2$ may be derived by the following Expression 6.

$$i_2 = 2\alpha + \beta + \theta_1 - 90 > \theta_c \quad \text{[Expression 6]}$$

The light incident upon the second inclined surface 202 at the incidence angle of $i_2$, which is greater than $\theta_c$ may be totally internally reflected toward the third inclined surface 203.

As shown in FIGS. 6*a* and 6*b*, an incidence angle and a reflection angle at a reflective surface are equal. Accordingly, light reflected from the second inclined surface 202 forms an angle of β-A with respect to the normal direction of the front surface 100 of the handle portion 11. Here, A is as follows.

$$A = 180 - 2\alpha - \beta - \theta_1$$

Figure 6C:
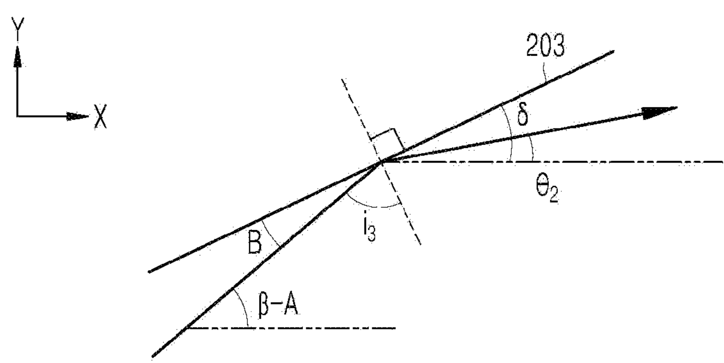
FIG. 6*c* is an enlarged view of a portion F of the light transmissive injection molded article of FIG. 5, and is a view showing an advance path of light at the third inclined surface.

FIG. 6*c* is an enlarged view of a portion F of the light transmissive injection molded article 10 of FIG. 5, and is a view showing an advance path of light at the third inclined surface 203.

As shown in FIGS. 6*a* and 6*b*, light reflected from the second inclined surface 202 at a reflection angle of $i_2$ may be incident upon the third inclined surface 203 at an incidence angle of $i_3$. $i_3$ may be derived by the following Expression 7.

$$i_3 = -2\alpha + 2\beta + \delta + \theta_1 - 90 > \theta_c \quad \text{[Expression 7]}$$

The light incident upon the third inclined surface 203 at the incidence angle of $i_3$, which is greater than $\theta_c$, may be totally internally reflected toward the front surface 100 of the handle portion 11 of the first drawer 10A.

As shown in FIG. 6*c*, an incidence angle and a reflection angle at a reflective surface are equal. Accordingly, light reflected from the third inclined surface 203 forms an angle of δ-B with respect to the normal direction of the front surface 100 of the handle portion 11 of the first drawer 10A. Here, B is as follows.

$$B = \beta - A - \delta$$

To enable the light reflected from the third inclined surface 203 to advance to the eye 3 of the user after being refracted from the front surface 100 of the handle portion 11 of the first drawer 10A, the following Expression 8 should be satisfied.

$$\theta_2 = \delta - B \quad \text{[Expression 8]}$$

$$\theta_2 = -2\alpha - 2\beta + 2\delta - \theta_1 + 180$$

To enable the light reflected from the first inclined surface 201 to be completely reflected from the second inclined surface 202 and, at the same time, enable the light reflected from the second inclined surface 202 to be completely reflected from the third inclined surface 203, as shown in FIG. 5, the following expression should be satisfied.

$$L_1\cos\alpha - L_2\cos\beta = L_4\cos(2\alpha + \theta_1)$$

$$L_1\sin\alpha + L_2\sin\beta = L_4\sin(2\alpha + \theta_1)$$

Here, $L_1$ is a length of the first inclined surface 201, $L_2$ is a length of the second inclined surface 202, and $L_4$ is a length of a longest one of virtual lines interconnecting a point of the first inclined surface 201 and a point of the second inclined surface 202. Accordingly, when α, β, and $\theta_0$ are determined, $L_1$ and $L_2$ have a predetermined ratio. The above expression may be arranged into the following Expression 9.

$$\tan(2\alpha + \theta_1) = \frac{L_1\sin\alpha + L_2\sin\beta}{L_1\cos\alpha - L_2\cos\beta} \quad \text{[Expression 9]}$$

For arrangement of a plurality of light reflection patterns 210 parallel to the front surface 100 in the Y-axis direction, the following Expression 10 should be satisfied. Expression 10 means that a minimum distance between the front surface 100 and the first inclined surface 201 is equal to a minimum distance between the front surface 100 and the third inclined surface 203.

$$L_1\cos\alpha - L_2\cos\beta = L_3\cos\delta \quad \text{[Expression 10]}$$

A light reflection pattern 210 having various shapes and various sizes may be derived by determining $\theta_0$, $\theta_3$, $n_1$, α, β, δ, $L_1$, $L_2$, and $L_3$ under conditions satisfying the above-described Expressions 1 to 10.

For example, $\theta_0$ may be 41.8°, and $\theta_3$ may be 43.0° under conditions satisfying the above-described Expressions 1 to 8. $n_1$ may be 1.59. Under conditions satisfying the above-described Expressions 9 and 10, $L_1$ may be 0.049 mm, $L_2$ may be 0.041 mm, and $L_3$ may be 0.041 mm. The length of the second inclined surface 202 in the pitch direction of the light reflection pattern 210, that is, the Y-axis direction, may be 0.04 mm. The pitch in the Y-axis direction of the first inclined surface 201, the second inclined surface 202, and the third inclined surface 203 forming the light reflection pattern 210 may be 0.07 mm.

Figure 7:
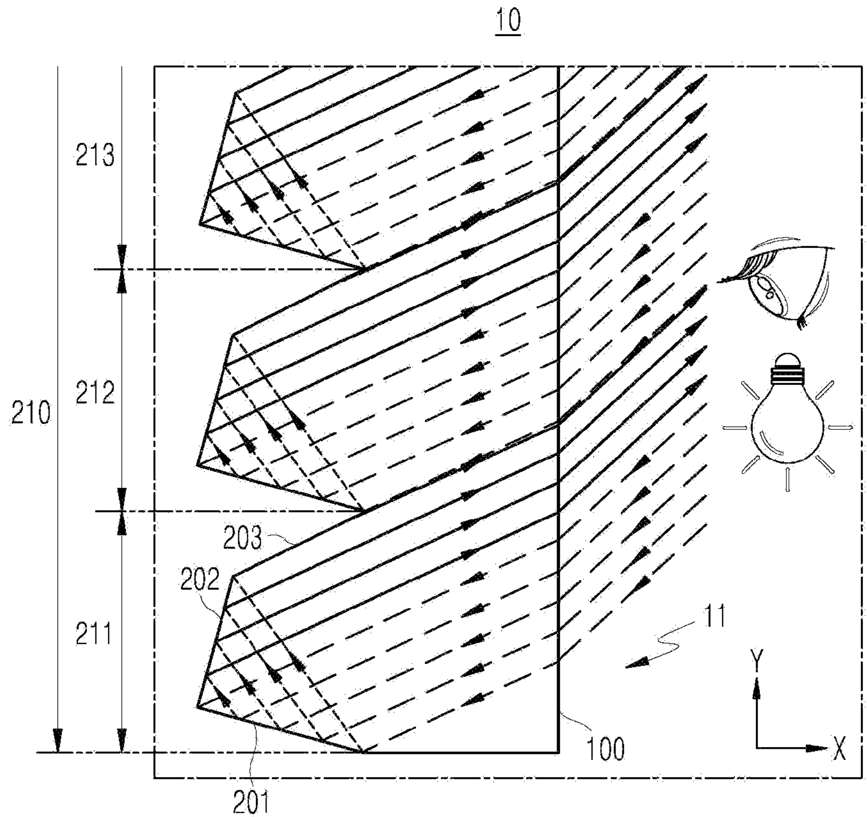
FIG. 7 is an enlarged view of the portion C of the light transmissive injection molded article of FIG. 4*b*, and is a view showing an advance path of light incident upon the front surface of the light transmissive injection molded article at $\theta_0$.

FIG. 7 is an enlarged view of the portion C of the light transmissive injection molded article 10 of FIG. 4*b*, and is a view showing an advance path of light incident upon the front surface 100 of the light transmissive injection molded article 10 at $\theta_0$. FIG. 7 is a view showing an advance path of light sequentially totally internally reflected from the first inclined surface 201, the second inclined surface 202, and the third inclined surface 203 after passing through the front surface 100 of the light transmissive injection molded article 10.

Figure 8:
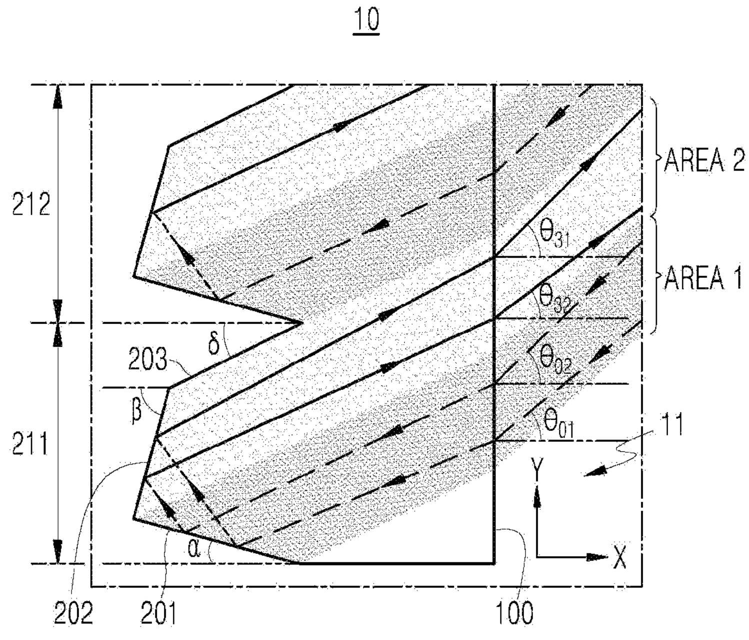
FIG. 8 is an enlarged view of the portion C of the light transmissive injection molded article of FIG. 4*b*, and is a view showing advance paths of light incident upon the front surface of the light transmissive injection molded article at $\theta_{01}$ and $\theta_{02}$.

FIG. 8 is an enlarged view of the portion C of the light transmissive injection molded article 10 of FIG. 4*b*, and is a view showing advance paths of light incident upon the front surface 100 of the light transmissive injection molded article 10 at $\theta_{01}$ and $\theta_{02}$.

The shape and size of the light transmissive injection molded article 10 shown in FIG. 8 are identical to the shape and size of the light transmissive injection molded article 10 shown in FIG. 7. Of course, FIG. 8 shows the case in which incidence angles of light incident upon the front surface 100 of the light transmissive injection molded article 10 are $\theta_{01}$ and $\theta_{02}$.

As shown in FIG. 8, when the incidence angle $\theta_{01}$ of the light incident upon the front surface 100 of the light transmissive injection molded article 10 under conditions satisfying the above-described Expressions 1 to 8 is 40°, a refraction angle $\theta_{31}$ of light refracted from the front surface 100 of the light transmissive injection molded article 10 is varied to 44.9° in order to enable the light to be incident upon the eye 3 of the user.

In addition, when the incidence angle $\theta_{02}$ of the light incident upon the front surface 100 of the light transmissive injection molded article 10 under conditions satisfying the above-described Expressions 1 to 8 is 46°, a refraction angle $\theta_{32}$ of light refracted from the front surface 100 of the light transmissive injection molded article 10 is varied to 39.0° in order to enable the light to be incident upon the eye 3 of the user.

Figure 9:
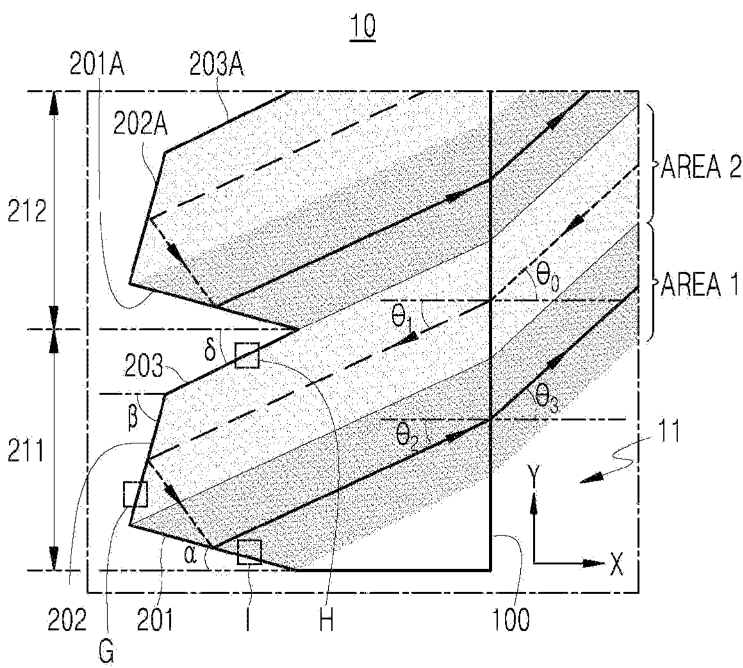
FIG. 9 is an enlarged view of the portion C of the light transmissive injection molded article of FIG. 4*b*, and is a view briefly showing an advance path of light incident upon the front surface of the light transmissive injection molded article at $\theta_0$.

FIG. 9 is an enlarged view of the portion C of the light transmissive injection molded article 10 of FIG. 4*b*, and is a view briefly showing an advance path of light incident upon the front surface 100 of the light transmissive injection molded article 10 at $\theta_0$.

As shown in FIG. 9, the first inclined surface 201, the second inclined surface 202, and the third inclined surface 203 may reflect light passing through the front surface 100 of the handle portion 11 of the first drawer 10A in a reverse order. That is, the first inclined surface 201, the second inclined surface 202, and the third inclined surface 203 may completely reflect the light passing through the front surface 100 of the handle portion 11 of the first drawer 10A in a sequential order and a reverse order.

As shown in FIGS. 5 and 9, light from the lighting 2 passes through the front surface 100 of the light transmissive injection molded article 10 in both a first area AREA1 and a second area AREA2 of the front surface 100 of the handle portion 11. The first inclined surface 201, the second inclined surface 202, and the third inclined surface 203 completely reflect light passing through the first area AREA1 and the second area AREA2 of the front surface 100 of the handle portion 11 of the first drawer 10A in a sequential order and a reverse order.

The first area AREA1 means the front surface 100 of the handle portion 11 upon which light from the lighting 2 is incident when the first inclined surface 201, the second inclined surface 202, and the third inclined surface 203 sequentially reflect light passing through the front surface 100 of the handle portion 11 of the first drawer 10A.

The second area AREA2 means the front surface 100 of the handle portion 11 upon which light from the lighting 2 is incident when the first inclined surface 201, the second inclined surface 202, and the third inclined surface 203 reflect light passing through the front surface 100 of the handle portion 11 of the first drawer 10A in a reverse order.

$\theta_0$ and $\theta_3$ may form a slight angle difference, but both light reflected from the first area AREA1 of the front surface 100 of the handle portion 11 and light reflected from the second area AREA2 of the front surface 100 of the handle portion 11 may be incident upon the eye 3 of the user.

Hereinafter, an advance path of light when the first inclined surface 201, the second inclined surface 202, and the third inclined surface 203 reflect light passing through the front surface 100 of the handle portion 11 of the first drawer 10A in a reverse order will be described.

Figure 10A:
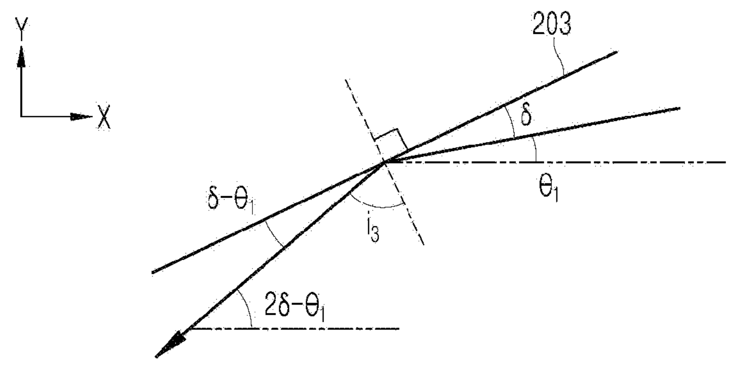
FIG. 10*a* is an enlarged view of a portion G of the light transmissive injection molded article of FIG. 9, and is a view showing an advance path of light at a third inclined surface.
Figure 10B:
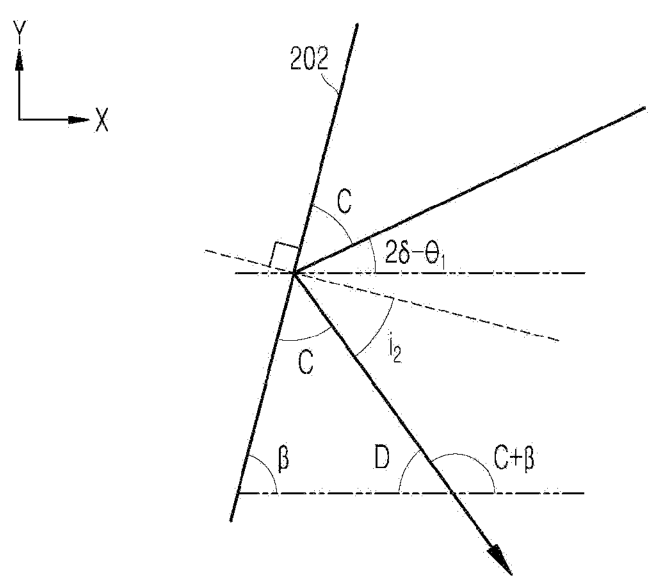
FIG. 10*b* is an enlarged view of a portion H of the light transmissive injection molded article of FIG. 9, and is a view showing an advance path of light at the second inclined surface.

FIG. 10*a* is an enlarged view of a portion G of the light transmissive injection molded article 10 of FIG. 9, and is a view showing an advance path of light at the third inclined surface 203. FIG. 10*b* is an enlarged view of a portion H of the light transmissive injection molded article 10 of FIG. 9, and is a view showing an advance path of light at the second inclined surface 202.

As shown in FIGS. 10*a* and 10*b*, light refracted at a refraction angle of $\theta_1$ from the front surface 100 of the handle portion 11 of the first drawer 10A may be incident upon the third inclined surface 203 at an incidence angle of $i_3$. $i_3$ may be derived by the following Expression 11.

$$i_3 = -\delta + \theta_1 + 90 > \theta_c \qquad \text{[Expression 11]}$$

$$\theta_c = \sin^{-1}\left(\frac{1}{n_1}\right)$$

Here, $\theta_c$ is an incidence angle at which total internal reflection begins. That is, $\theta_c$ is a critical angle. Light incident upon the third inclined surface 203 at an incidence angle of i3, which is greater than $\theta_c$, may be totally internally reflected toward the second inclined surface 202.

As shown in FIGS. 10*a* and 10*b*, an incidence angle and a reflection angle at a reflective surface are equal. Accordingly, light reflected from the third inclined surface 203 forms an angle of $2\delta-\theta_1$ with respect to the normal direction of the front surface 100 of the handle portion 11.

As shown in FIGS. 10*a* and 10*b*, light reflected from the third inclined surface 203 at a reflection angle of $i_3$ may be incident upon the second inclined surface 202 at an incidence angle of $i_2$. $i_2$ may be derived by the following Expression 12.

$$i_2 = 90 - C > \theta_c \qquad \text{[Expression 12]}$$

$$C = \beta - 2\delta + \theta_1$$

The light incident upon the second inclined surface 202 at the incidence angle of $i_2$, which is greater than $\theta_c$, may be totally internally reflected toward the first inclined surface 201.

As shown in FIGS. 10*a* and 10*b*, an incidence angle and a reflection angle at a reflective surface are equal. Accordingly, light reflected from the second inclined surface 202 forms an angle of D with respect to the normal direction of the front surface 100 of the handle portion 11. Here, D is as follows.

$$D = 180 - C - \beta$$

Figure 10C:
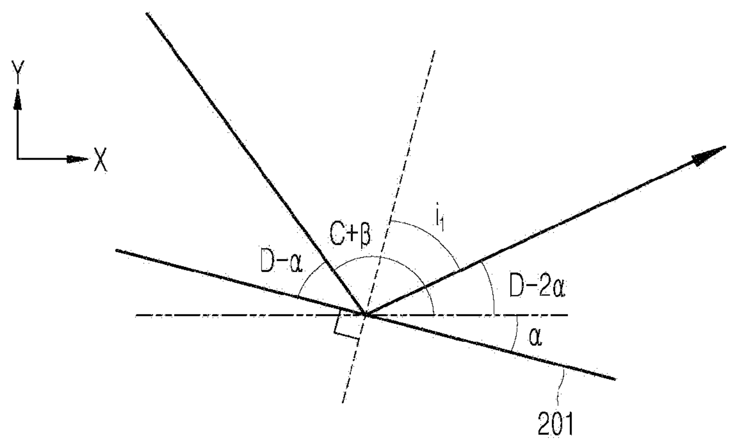
FIG. 10*c* is an enlarged view of a portion I of the light transmissive injection molded article of FIG. 9, and is a view showing an advance path of light at the first inclined surface.

FIG. 10*c* is an enlarged view of a portion I of the light transmissive injection molded article 10 of FIG. 9, and is a view showing an advance path of light at the first inclined surface 201.

As shown in FIGS. 10*a* and 10*b*, light reflected from the second inclined surface 202 at a reflection of $i_2$ may be incident upon the first inclined surface 201 at an incidence angle of $i_1$. $i_1$ may be derived by the following Expression 13.

$$i_1 = 90 - D + \alpha \quad \text{[Expression 13]}$$

The light incident upon the first inclined surface 201 at the incidence angle of $i_1$, which is greater than $\theta_c$, may be totally internally reflected toward the front surface 100 of the handle portion 11 of the first drawer 10A.

As shown in FIG. 10*c*, an incidence angle and a reflection angle at a reflective surface are equal. Accordingly, light reflected from the first inclined surface 201 forms an angle of D-2α with respect to the normal direction of the front surface 100 of the handle portion 11.

To enable the light reflected from the first inclined surface 201 to advance to the eye 3 of the user after being refracted from the front surface 100 of the handle portion 11 of the first drawer 10A, the following Expression 14 should be satisfied.

$$\theta_2 = D - 2\alpha \quad \text{[Expression 14]}$$

$$\theta_2 = -2\alpha - 2\beta + 2\delta - \theta_1 + 180$$

A light reflection pattern 210 having various shapes and various sizes may be derived by determining $\theta_0$, $\theta_3$, $n_1$, α, β, δ, $L_1$, $L_2$, and $L_3$ under conditions satisfying the above-described Expressions 9 to 14.

Figure 11:
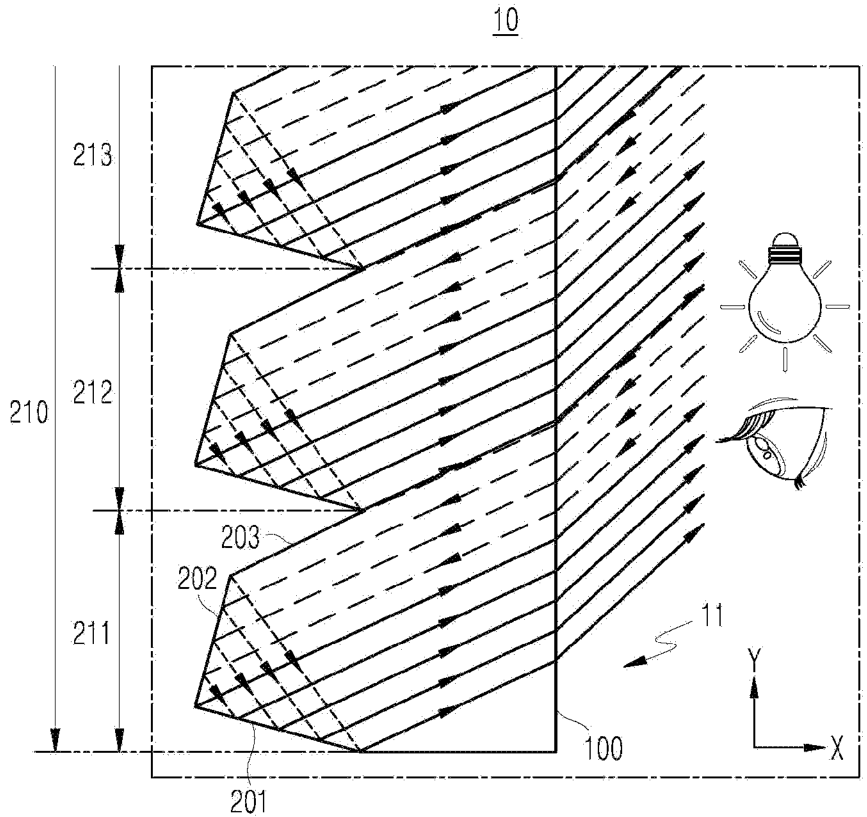
FIG. 11 is an enlarged view of the portion C of the light transmissive injection molded article of FIG. 4*b*, and is a view showing an advance path of light incident upon the front surface of the light transmissive injection molded article at $\theta_0$.

For example, $\theta_0$ may be 41.8°, and $\theta_3$ may be 43.0°. $n_1$ may be 1.59 FIG. 11 is an enlarged view of the portion C of the light transmissive injection molded article 10 of FIG. 4*b*, and is a view showing an advance path of light incident upon the front surface 100 of the light transmissive injection molded article 10 at $\theta_0$. FIG. 11 is a view showing an advance path of light sequentially totally internally reflected from the first inclined surface 201, the second inclined surface 202, and the third inclined surface 203 after passing through the front surface 100 of the light transmissive injection molded article 10 in a reverse order.

For example, $L_1$ may be 0.049 mm, $L_2$ may be 0.041 mm, and $L_3$ may be 0.041 mm. As shown in FIG. 11, the length of the second inclined surface 202 in the pitch direction of the light reflection pattern 210, that is, the Y-axis direction, may be 0.04 mm. The pitch in the Y-axis direction of the first inclined surface 201, the second inclined surface 202, and the third inclined surface 203 forming the light reflection pattern 210 may be 0.07 mm.

Figure 12:
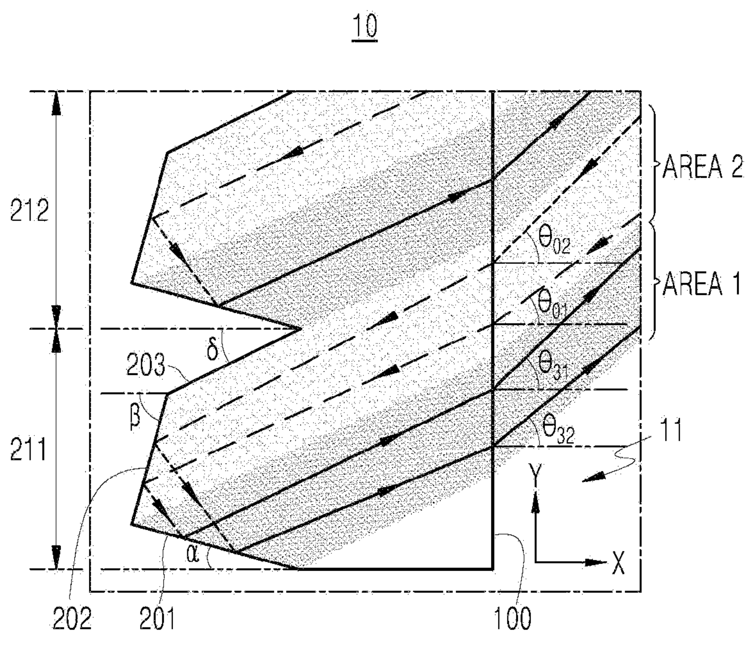
FIG. 12 is an enlarged view of the portion C of the light transmissive injection molded article of FIG. 4*b*, and is a view showing an advance path of light incident upon the front surface of the light transmissive injection molded article at $\theta_{01}$ and $\theta_{02}$.

FIG. 12 is an enlarged view of the portion C of the light transmissive injection molded article 10 of FIG. 4*b*, and is a view showing an advance path of light incident upon the front surface 100 of the light transmissive injection molded article 10 at $\theta_{01}$ and $\theta_{02}$.

The shape and size of the light transmissive injection molded article 10 shown in FIG. 12 are identical to the shape and size of the light transmissive injection molded article 10 shown in FIG. 11. Of course, FIG. 12 shows the case in which incidence angles of light incident upon the front surface 100 of the light transmissive injection molded article 10 are $\theta_{01}$ and $\theta_{02}$.

As shown in FIG. 12, when the incidence angle $\theta_{01}$ of the light incident upon the front surface 100 of the light transmissive injection molded article 10 is 40°, a refraction angle $\theta_{31}$ of light refracted from the front surface 100 of the light transmissive injection molded article 10 is varied to 44.9° in order to enable the light to be incident upon the eye 3 of the user.

In addition, when the incidence angle $\theta_{02}$ of the light incident upon the front surface 100 of the light transmissive injection molded article 10 is 46°, a refraction angle $\theta_{32}$ of light refracted from the front surface 100 of the light transmissive injection molded article 10 is varied to 39.0° in order to enable the light to be incident upon the eye 3 of the user.

Figure 13:
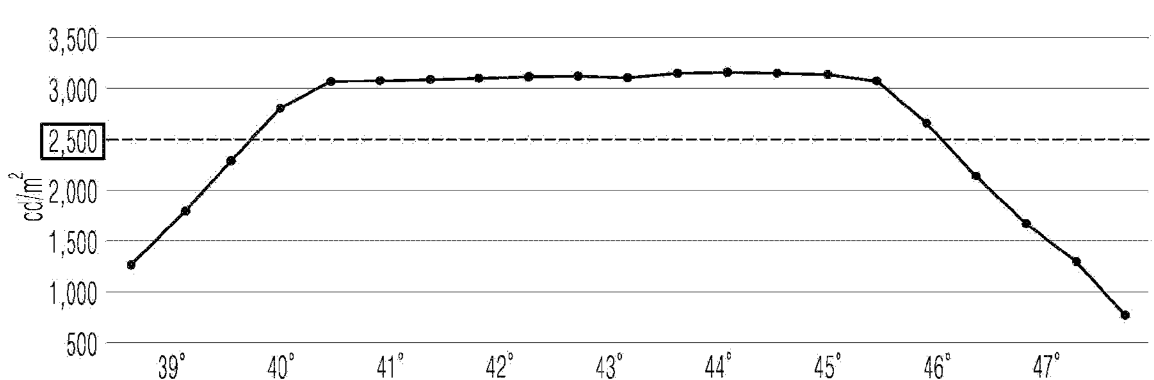
FIG. 13 is a graph depicting data obtained through simulation of luminance values of the portion C of the light transmissive injection molded article at different viewing angles.

FIG. 13 is a graph depicting data obtained through simulation of luminance values of the portion C of the light transmissive injection molded article 10 at different viewing angles.

Conditions of the simulation may be as follows. $n_1$ may be 1.59 As shown in FIG. 13, it was interpreted that luminance of light advancing from the front surface 100 of the light transmissive injection molded article 10 at a viewing angle $\theta_3$ of the user when 03 is within a range of about 40 to 46° is 2,500 cd/m2.

While the preferred embodiments of the present invention have been illustrated and described above, the present invention is not limited to the specific embodiments described above. It goes without saying that various modifications can be made within the scope of the present invention by persons having ordinary knowledge in the technical field to which the invention belongs, and such modifications should not be understood individually from the technical idea and prospects of the present invention, and is within the scope of the present invention as claimed in the claims.

MODE FOR THE INVENTION

Many modifications to the above embodiments may be made without altering the nature of the invention. The dimensions and shapes of the components and the construction materials may be modified for particular circumstances. While various embodiments have been described above, it should be understood that they have been presented by way of example only, and not as limitations.

INDUSTRIAL APPLICABILITY

In accordance with the light transmissive injection molded article according to the present invention, it may be possible to enable recycling of the light transmissive injection molded article while exhibiting a metallic texture by light reflection at a predetermined area of the light transmissive injection molded article, without using expensive hot stamping, as one or more planes are formed at a front surface and a back surface of the light transmissive injection molded article, and the planes of the back surface reflect light passing through the front surface toward the front surface. In this regard, the present invention goes beyond the limits of the existing technology and, as such, may not only utilize technology associated therewith, but also may have sufficient possibility of marketing or sales of devices, to which the present invention is applied, and may be practically clearly implemented. In this regard, the present invention has industrial applicability.

The invention claimed is:

1. A light transmissive injection molded article formed with one or more planes at a front surface and a back surface thereof, wherein the planes of the back surface forming a plurality of light reflection patterns comprise:

a first inclined surface forming a surface inclined toward the back surface from a normal direction of the front surface;

a second inclined surface forming a surface inclined from the back surface toward the front surface; and a third inclined surface forming a surface inclined from the second surface toward the front surface, wherein the first inclined surface, the second inclined surface, and the third inclined surface reflect at least a portion of light passing through the front surface in a sequential order and a reverse order, wherein ‘in a sequential order’ means that the light passes through the first inclined surface before passing through the second inclined surface and ‘in a reverse order’ means that the light passes through the second inclined surface before passing through the first inclined surface, wherein the first inclined surface gradually approximates to the front surface as the first inclined surface extends far from the second inclined surface, and the first inclined surface and the second inclined surface are interconnected, wherein the first inclined surface and the second inclined surface satisfy a following expression:

$$\tan(2\alpha+\theta_1)=\frac{L_1\sin\alpha+L_2\sin\beta}{L_1\cos\alpha-L_2\cos\beta}$$

$$\theta_1=\sin^{-1}\left(\frac{1}{n_1}\sin\theta_0\right)$$

where, $\theta_0$ is an incidence angle of light externally incident upon the front surface, $\theta_0$ is a refraction angle of the light incident upon the front surface, $n_1$ is a refractive index of the light transmissive injection molded article, $L_1$ is a length of the first inclined surface measured along an inclined direction of the first inclined surface, $L_2$ is a length of the second inclined surface measured along an inclined direction of the second inclined surface, $\alpha$ is an angle of the first inclined surface with respect to the normal direction of the front surface and $\beta$ is an angle of the second inclined surface with respect to the normal direction of the front surface.

2. The light transmissive injection molded article according to claim 1, wherein the first inclined surface, the second inclined surface, and the third inclined surface satisfy a following expression in order to totally internally reflect light passing through the front surface in a sequential order and a reverse order:

$$i_1=-\alpha-\theta_1+90>\theta_c$$

$$i_2=2\alpha+\beta+\theta_1-90>\theta_c$$

$$i_3=-2\alpha+2\beta+\delta+\theta_1-90>\theta_c$$

$$\theta_c=\sin^{-1}\left(\frac{1}{n_1}\right)$$

where, $i_1$ is a reflection angle of light at the first inclined surface, $i_2$ is a reflection angle of light at the second inclined surface, $i_3$ is a reflection angle of light at the third inclined surface, $\delta$ is an angle of the third inclined surface with respect to the normal direction of the front surface, and $\theta_c$ is a critical angle of the light transmissive injection molded article.

3. The light transmissive injection molded article according to claim 1, wherein:

the second inclined surface and the third inclined surface are interconnected; and the first inclined surface, the second inclined surface, and the third inclined surface satisfy a following expression:

$$L_1\cos\alpha-L_2\cos\beta=L_3\cos\delta$$

where, $L_3$ is a length of the third inclined surface, and $\delta$ is an angle of the third inclined surface with respect to the normal direction of the front surface.

4. The light transmissive injection molded article according to claim 3, wherein the first inclined surface, the second inclined surface, and the third inclined surface satisfy a following expression:

$$\theta_2=-2\alpha-2\beta+2\delta-\theta_1+180$$

$$\theta_3=\sin^{-1}(n_1\sin\theta_2)$$

where, $\delta$ is an angle of the third inclined surface with respect to the normal direction of the front surface, $\theta_2$ is an incidence angle of light incident upon the front surface after being reflected from the third inclined surface, $\theta_3$ is a refraction angle of the light incident upon the front surface after being reflected from the third inclined surface.

5. The light transmissive injection molded article according to claim 1, wherein an angle of the first inclined surface with respect to the normal direction of the front surface is 15°.

6. The light transmissive injection molded article according to claim 5, wherein an angle of the second inclined surface with respect to the normal direction of the front surface is 75.3°.

7. The light transmissive injection molded article according to claim 6, wherein an angle of the third inclined surface with respect to the normal direction of the front surface is 25.4°.

8. The light transmissive injection molded article according to claim 7, wherein:

a pitch of the first inclined surface, the second inclined surface, and the third inclined surface forming the light reflection pattern is 0.07 mm; and a length of the second inclined surface in a pitch direction of the light reflection pattern is 0.04 mm.

9. A home appliance comprising the light transmissive injection molded article according to claim 1.

10. A light transmissive injection molded article formed with one or more planes at a front surface and a back surface thereof, wherein:

the planes of the back surface form a light reflection pattern configured to reflect light passing through the front surface toward the front surface; and the planes of the back surface comprise:

a first inclined surface inclined with respect to a normal direction of the front surface;

a second inclined surface gradually approximating to the front surface as the second inclined surface extends far from the first inclined surface; and a third inclined surface provided at a side opposite to the first inclined surface with reference to the second inclined surface, the third inclined surface gradually approximating to the front surface as the third inclined surface extends far from the second inclined surface, wherein the first inclined surface, the second inclined surface, and the third inclined surface reflect at least a portion of light passing through the front surface in a sequential order and a reverse order, wherein 'in a sequential order' means that the light passes through the first inclined surface before passing through the second inclined surface, and 'in a reverse order' means that the light passes through the second inclined surface before passing through the first inclined surface, wherein the first inclined surface gradually approximates to the front surface as the first inclined surface extends far from the second inclined surface, and the first inclined surface and the second inclined surface are interconnected, wherein the first inclined surface and the second inclined surface satisfy a following expression:

$$\tan(2\alpha+\theta_1)=\frac{L_1\sin\alpha+L_2\sin\beta}{L_1\cos\alpha-L_2\cos\beta}$$

$$\theta_1=\sin^{-1}\left(\frac{1}{n_1}\sin\theta_0\right)$$

where, $\theta_0$ is an incidence angle of light externally incident upon the front surface, $\theta_1$ is a refraction angle of the light incident upon the front surface, $n_1$ is a refractive index of the light transmissive injection molded article, $L_1$ is a length of the first inclined surface measured along an inclined direction of the first inclined surface, $L_2$ is a length of the second inclined surface measured along an inclined direction of the second inclined surface, $\alpha$ is an angle of the first inclined surface with respect to the normal direction of the front surface, and $\beta$ is an angle of the second inclined surface with respect to the normal direction of the front surface.

11. The light transmissive injection molded article according to claim 10, wherein the planes of the back surface comprise:

a 1A-th inclined surface provided at a side opposite to the second inclined surface with reference to the third inclined surface, the 1A-th inclined surface being inclined with respect to the normal direction of the front surface;

a 2A-th inclined surface provided at a side opposite to the third inclined surface with reference to the 1A-th inclined surface, the 2A-th inclined surface gradually approximating to the front surface as the 2A-th inclined surface extends far from the 1A-th inclined surface; and a 3A-th inclined surface provided at a side opposite to the 1A-th inclined surface with reference to the 2A-th inclined surface, the 3A-th inclined surface gradually approximating to the front surface as the 3A-th inclined surface extends far from the 2A-th inclined surface.

12. The light transmissive injection molded article according to claim 11, wherein the 1A-th inclined surface, the 2A-th inclined surface, and the 3A-th inclined surface reflect the light passing through the front surface in a sequential order and a reverse order.

13. A home appliance comprising the light transmissive injection molded article according to claim 10.

14. The light transmissive injection molded article according to claim 10, wherein the first inclined surface, the second inclined surface, and the third inclined surface satisfy a following expression in order to totally internally reflect light passing through the front surface in a sequential order and a reverse order:

$$i_1=-\alpha-\theta_1+90>\theta_c$$

$$i_2=2\alpha+\beta+\theta_1-90>\theta_c$$

$$i_3=-2\alpha+2\beta+\delta+\theta_1-90>\theta_c$$

$$\theta_c=\sin^{-1}\left(\frac{1}{n_1}\right)$$

where, $i_1$ is a reflection angle of light at the first inclined surface, $i_2$ is a reflection angle of light at the second inclined surface, $i_3$ is a reflection angle of light at the third inclined surface, $\delta$ is an angle of the third inclined surface with respect to the normal direction of the front surface, and $\theta_c$ is a critical angle of the light transmissive injection molded article.

15. The light transmissive injection molded article according to claim 10, wherein:

the second inclined surface and the third inclined surface are interconnected; and the first inclined surface, the second inclined surface, and the third inclined surface satisfy a following expression:

$$L_1\cos\alpha-L_2\cos\beta=L_3\cos\delta$$

where, $L_3$ is a length of the third inclined surface, and $\delta$ is an angle of the third inclined surface with respect to the normal direction of the front surface.

16. The light transmissive injection molded article according to claim 10, wherein an angle of the first inclined surface with respect to the normal direction of the front surface is 15°.

* * * * *